United States Patent
Ruppert, Jr. et al.

[19]

[11] Patent Number: 5,924,504
[45] Date of Patent: Jul. 20, 1999

[54] SUSPENSION DRIVE UNIT ASSEMBLY FOR AN ELECTRICALLY DRIVEN VEHICLE

[75] Inventors: Malcolm F. Ruppert, Jr., Hebron; Bradley A. Arnold, Granville, both of Ohio

[73] Assignee: Meritor Heavy Vehicle Systems, LLC, Troy, Mich.

[21] Appl. No.: 08/801,532

[22] Filed: Feb. 18, 1997

[51] Int. Cl.[6] ............................................. B60K 7/00
[52] U.S. Cl. ..................... 180/61; 180/62; 180/65.6; 180/349; 180/69.6; 464/171; 464/88; 464/153; 74/606 R; 74/417; 74/421 A; 403/114; 403/113
[58] Field of Search .................. 180/65.5, 65.6, 180/60, 59, 61, 292, 300, 62, 349, 69.6; 280/124.156, 124.157, 759, 758; 464/182, 147, 153, 170, 171, 78, 88, 87; 74/606 R, 417, 421 A; 403/114, 113, 122, 142

[56] References Cited

U.S. PATENT DOCUMENTS

| | | | |
|---|---|---|---|
| 1,277,434 | 9/1918 | Leadbeater | 280/759 |
| 1,481,405 | 1/1924 | Anglada | 180/65.6 |
| 1,543,044 | 6/1925 | Anglada | 180/65.6 |
| 2,462,574 | 2/1949 | Wallace | 464/171 |
| 2,589,863 | 3/1952 | Quartullo | 180/65 |
| 3,812,928 | 5/1974 | Rockwell et al. | |
| 3,930,551 | 1/1976 | Cragg | |
| 4,270,622 | 6/1981 | Travis | |
| 4,330,045 | 5/1982 | Myers | |
| 5,238,454 | 8/1993 | Schmidt | 464/87 |

FOREIGN PATENT DOCUMENTS

| | | |
|---|---|---|
| 4112624 | 10/1992 | Germany . |
| 679027 | 12/1991 | Switzerland . |
| 502313 | 3/1939 | United Kingdom . |
| 1303615 | 1/1973 | United Kingdom . |

OTHER PUBLICATIONS

U.S. application No. 08/801,531 filed Feb. 18, 1997 "Low Floor Drive Unit Assembly For An Electrically Driven Vehicle".

U.S. application No. 08/801,536 filed Feb. 18, 1997 "Space Saving Mounting For Electrically Driven Vehicle Wheels".

*Primary Examiner*—Peter C. English
*Assistant Examiner*—William R. Zimmerli

[57] ABSTRACT

An automotive vehicle suspension unit assembly located near the sides of a vehicle includes a driving axle shaft, a gear box, an electric motor, and a suspension beam. The driving axle shaft, which drives a wheel hub of the vehicle, defines an axis of rotation about which the wheel hub rotates. The gear box includes a pinion shaft connected to a pinion gear which meshes with a ring gear. The pinion shaft is driven by a motor drive shaft which extends outwardly from the electric motor. The motor generates the torque necessary to drive the driving axle shaft. As known, suspension beams extend transversely to the axis of rotation of the driving axle shaft. The electric motor is pivotally attached to the gear box by means of a flexible coupling and is pivotally attached to the suspension beam by means of a movable connection. The flexible coupling allows the electric motor to pivot relative to the gear box and the movable connection allows the electric motor to pivot relative to the suspension beam as the suspension beam receives road load input.

20 Claims, 2 Drawing Sheets

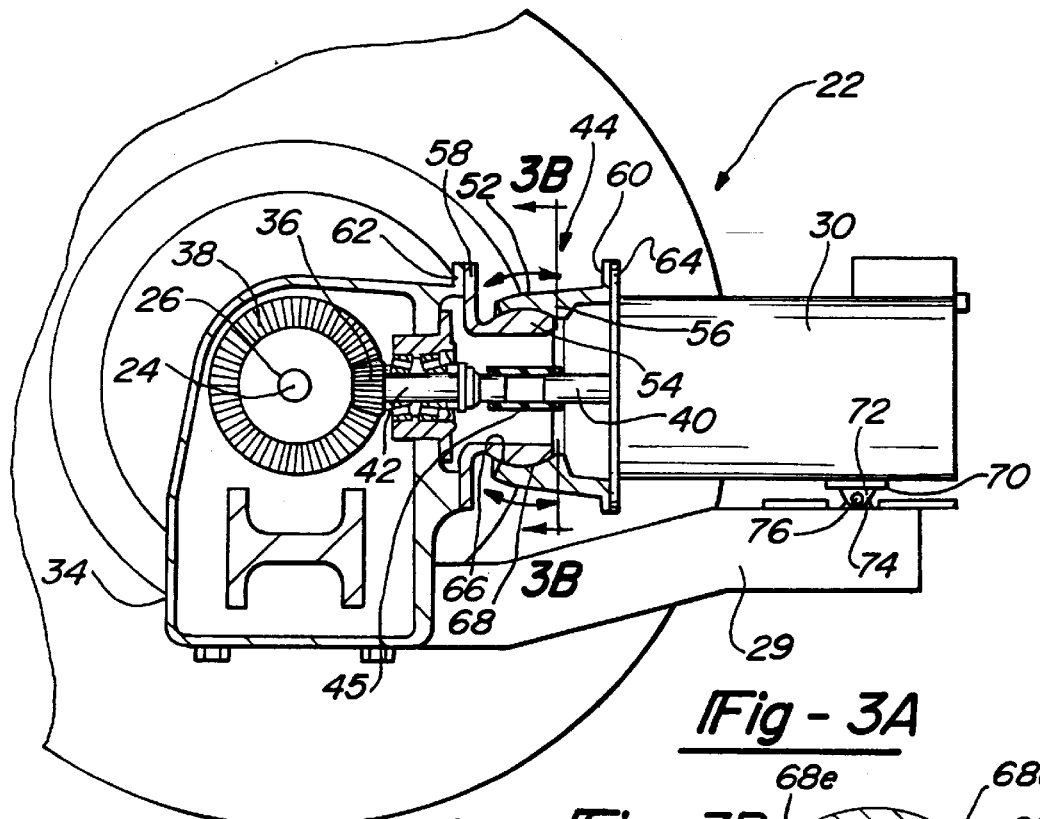
*Fig - 3A*
*Fig - 3B*
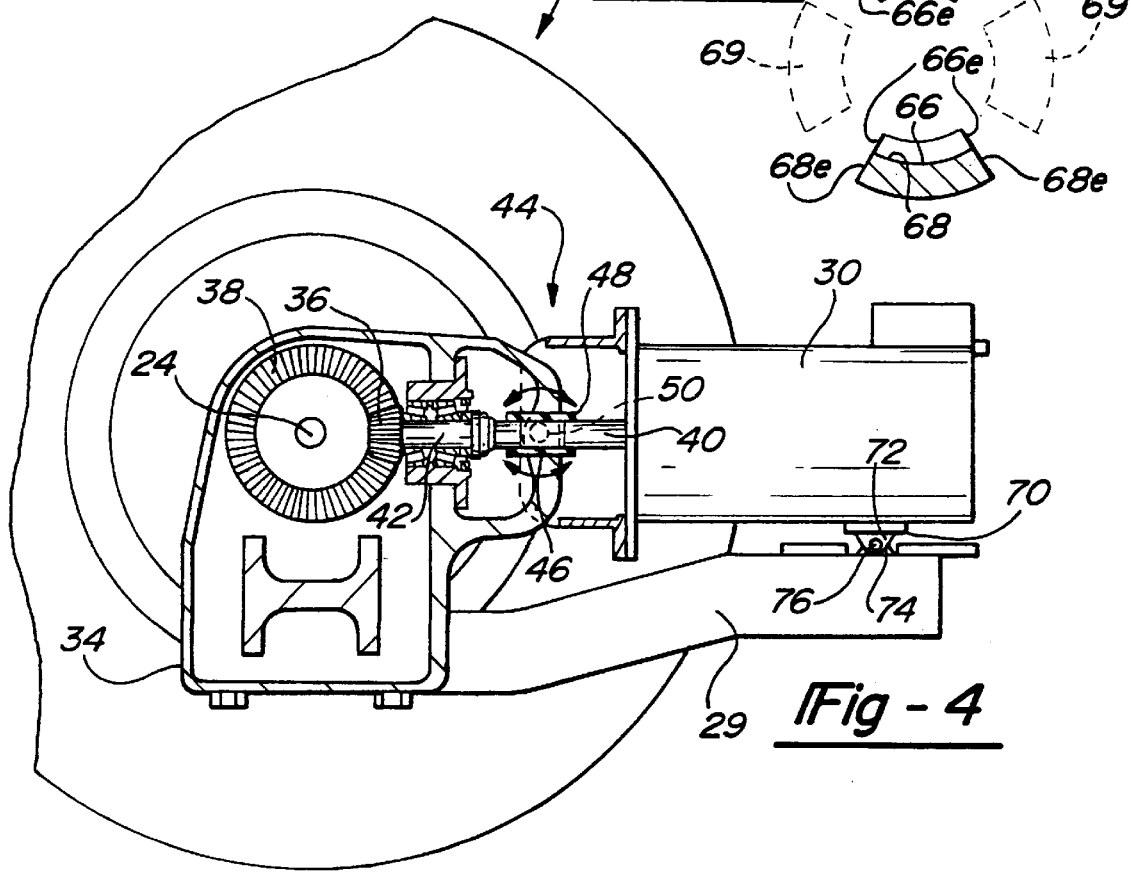
*Fig - 4*

SUSPENSION DRIVE UNIT ASSEMBLY FOR AN ELECTRICALLY DRIVEN VEHICLE

BACKGROUND OF THE INVENTION

This invention relates to an improved mounting structure for electric motors utilized to drive vehicle axles.

Mass transit vehicles such as buses or trolleys typically include passenger seats to the lateral sides of the vehicle frame. A central aisle extends between the passenger seats. Typically, the motors for driving the wheels of the vehicle have been centrally located. These motors have been connected to the axles by transmissions which extend laterally outwardly to the wheels.

With the above-described prior art structure, there are relatively large motor, transmission, or axle elements directly below the center of the vehicle. The aisle is typically in the center of the vehicle and normally goes over the axle, thus requiring the floor of the aisle to be relatively high. In one known bus, the floor rises over the axle through steps. It is undesirable to have passengers climb the steps to reach the aisle and seating areas. Thus, the aisle floor had to be undesirably high when using the prior art.

Recently, it has been proposed to utilize laterally mounted motors associated with each of the wheels, and drive the wheels through a beveled connection. This results in a great space savings, and allows the aisle floor to be lowered. This invention is described in copending patent application Ser. No. 08/801,531 filed on Feb. 18, 1997, entitled "Low Floor Drive Unit Assembly for an Electrically Driven Vehicle".

The invention described in the above-referenced application has the motor assembled to the center housing in a cantilever fashion. The motor may be relatively heavy, and the cantilevered attachment will put excessive loads into the attachment of the motor to the housing. If additional mounting supports are added to the axle to support and mount the electric motors, then the weight of the vehicle is increased and valuable packaging space is taken up by the additional brackets and mounting supports. Moreover, supports or brackets would have a very difficult time supporting the heavy motors.

SUMMARY OF THE INVENTION

The present invention utilizes the vehicle suspension beams to support the relatively heavy motors. By placing the motors on the suspension beams, the present invention does not require any extra mounting or attachment structure. Thus, the overall weight of the assembly is reduced. Moreover, the suspension beam is a relatively strong item, and is able to adequately support the motors.

The advantages offered by this invention are that it improves packaging and increases passenger compartment size by moving the electric motors to the sides of the vehicle. Also, by mounting the electric motors to existing structures on the axle a weight savings occurs because additional brackets and mounting supports are not required.

As known, the suspension beam interconnects the wheel axle housing, brake assemblies, etc. to air springs and is subject to twisting and bumping due to road inputs. The structural integrity of the electric motor is maintained by the use of a flexible coupling between the gear box and the electric motor and a movable connection between the electric motor and the suspension beam. The flexible coupling and movable connection allow the electric motor to pivot and move as the suspension beam flexes and twists in response to vehicle weight and road load inputs.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3A is a fragmentary view from the inside of the left wheel hub as shown in FIG. 2, partially broken away and in cross section, and showing a first embodiment of a flexible coupling;

FIG. 3B is a cross-sectional view through the coupling of FIG. 3A; and

FIG. 4 is a view similar to FIG. 3A but showing an alternative flexible coupling.

DETAILED DESCRIPTION OF A PREFERRED EMBODIMENT

Figure 1:
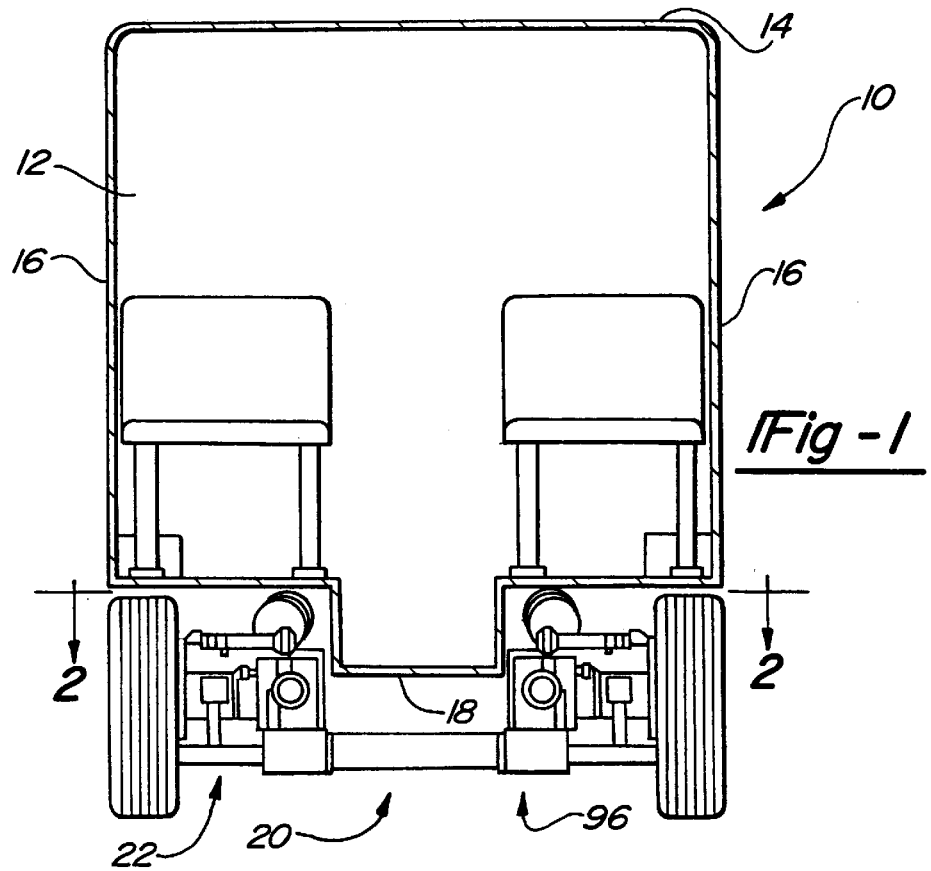
FIG. 1 is a cross sectional view of a vehicle incorporating the subject invention.
Figure 2:
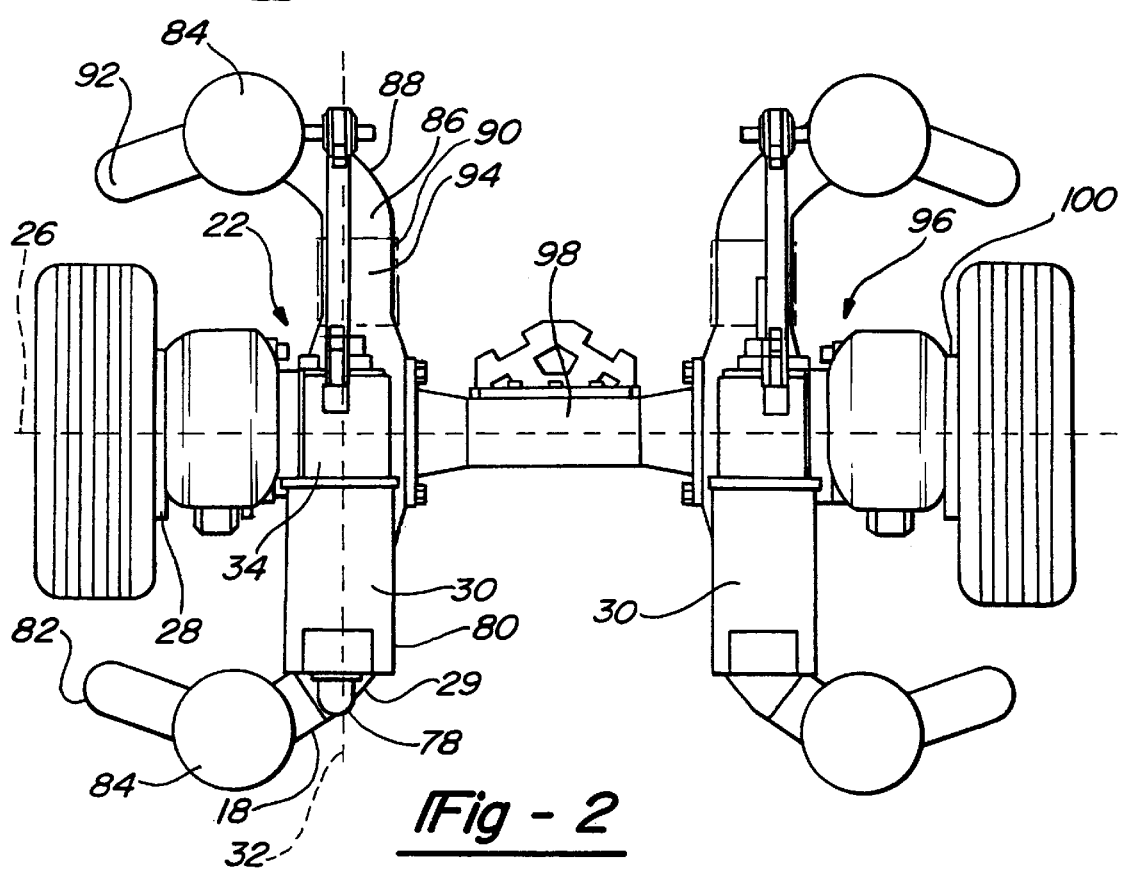
FIG. 2 is a cross sectional view taken along line 2—2 of FIG. 1.

Referring to the Figures, wherein like numerals indicate like or corresponding parts throughout the several views, an automotive vehicle is shown generally at 10. As shown in FIG. 1, automotive vehicle 10 includes a passenger compartment 12 defined by a roof 14, two side walls 16, and a vehicle floor 18. An axle assembly generally shown at 20, includes a first vehicle suspension drive unit assembly which is generally shown at 22 and a second vehicle suspension drive unit assembly which is generally shown at 96. As shown in FIG. 2, the first 22 and second 96 vehicle suspension drive unit assemblies drive the wheels about an axis of rotation 26.

As shown in FIG. 3A, axis 26 is parallel to a driving axle shaft 24 for the wheel and extends through the center of the driving axle shaft 24. The driving axle shaft 24 drives a first wheel hub 28 which revolves about the axis 26 of the driving axle shaft 24.

A first suspension beam 29 extends transversely to the axis 26 of the driving axle shaft 24 and adjacent to the first wheel hub 28. As is known, suspension beams are utilized to interconnect a fixed wheel axle housing and brake assembly to suspension elements such as air springs. The first suspension beam 29 supports an electric motor 30 which generates the torque to drive the driving axle shaft 24. As shown in FIG. 2, electric motor 30 defines an axis of rotation 32 transverse to the axis of rotation 26 of the driving axle shaft 24.

A gear box 34 interconnects the electric motor 30 and the driving axle shaft 24. The gear box 34 includes a pinion gear 36 and ring gear 38. A motor drive shaft 40 extends from the electric motor 30, along the axis 32 defined by the electric motor 30, and is coupled to a coaxial pinion shaft 42 which drives the pinion gear 36. The pinion gear 36 meshes with the ring gear 38 which revolves about the axis 26 of the driving axle shaft 24. As the ring gear 38 rotates, it drives the driving axle shaft 24 which turns the wheel hub 28.

The motor drive shaft 40 is connected to pinion shaft 42 by a flexible coupling. As the vehicle 10 receives road load input, the suspension beam 29 will move and flex. The flexible coupling can include a flexible tube portion 45 made of known materials.

As shown in FIG. 3A, the flexible coupling can also be a spherical joint 52. The spherical joint 52 comprises a inner portion 54 and an outer portion 56. The inner portion 54 has an inner flange 58 and the outer portion 56 has an outer flange 60. The inner flange 58 is joined to a gear box flange 62 and the outer flange 60 is joined to an electric motor flange 64. The inner portion 54 of the spherical joint 52 has a concave surface 66 which rotatably mates with a convex surface 68 of the outer portion 56. Therefore, the electric motor 30, attached to the outer portion 56 of the spherical joint 52, can pivot with respect to the gear box 34 which is attached to the inner portion 54 of the spherical joint 52. The center of the spherical joint 52 coincides with the center of the flexible coupling.

As shown in FIG. 3B, the inner portion 54 and outer portion 56 of the spherical joint 52 do not extend about 360 degrees about a central axis. Instead, edges such as shown at 66E and 68E are cutoff from each of the members. In this way, the members may be easily assembled. When the inner portion 54 is moved into the outer portion 56, the outer portion 56 is moved to the position shown in phantom at 69. The outer portion is then turned to reach the assembled position such as shown in FIG. 3A.

The flexible coupling could alternatively be a universal joint or Oldham joint 46, as shown in FIG. 4 as a black box to simplify the overall figure. It should be understood, that known universal joint couplings including two yokes that are driven for rotation with each other, but which may pivot relative to each other about three axes, would be preferably utilized in this embodiment.

For both embodiments, a moveable connection 70 interconnects the electric motor 30 and the first suspension beam 29 at a position spaced apart from the flexible coupling which interconnects the motor drive shaft 40 and the pinion shaft 42. Connection 70 can also be of various forms. A preferred connection 70 includes an electric motor mount 72 and a suspension beam mount 74 that are pivotally connected by a pivot pin 76. As the first suspension beam 29 moves up and down in response to road load input, the axis 32 of the electric motor 30 pivots relative to the first suspension beam 29.

As shown in FIGS. 2 and 3A, suspension beam 29 forms a C-shaped extension 78 which has a first end 80 and a second end 82. The suspension beam mount 74 that interconnects with the motor mount 72 to form the connection 70 is mounted adjacent end 80 and near the C-shaped extension 78. A second suspension beam 86 extending in the opposite direction from the first suspension beam 29 also forms a C-shaped extension 88 with a first end 90 and a second end 92. A counterweight 94 is disposed near the first end 90 of the second suspension beam 86. The counterweight 94 compensates for weight imbalance resulting from the electric motor 30 being supported by the first suspension beam 29 in a location extending to one side of the axis 26 of the driving axle shaft 24. Without a counterweight 94, the weight imbalance could become evident when vehicle 10 experiences vertical accelerations due to road bumps, rail road tracks, etc. The counterweight 94 can be focused or spread over the length of the second suspension beam 86, and can be cast in place, added later by attaching a weight, or by pouring molten lead into a cavity (not shown) in the second suspension beam 86. Located near the second ends 82, 92 of the C-shaped extensions 78, 88 are circular pads 84 for mounting resilient suspension means (not shown) between the vehicle 10 and the first 29 and second 86 suspension beams. Typically air springs are mounted on pads 84.

A second suspension drive unit assembly, generally shown at 96, consisting of the same or similar components as the first suspension drive unit assembly 22 is interconnected to the first suspension drive unit assembly 22 by a support beam 98. The second suspension drive unit assembly 96 drives a second wheel hub 100, opposite of the first wheel hub 28 but which also revolves about the axis 26 of the driving axle shaft 24. Packaging advantages exist if the electric motors 30 of the first 22 and second 96 suspension drive unit assemblies extend in the same direction from the support beam 98.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. An automotive vehicle suspension drive unit assembly comprising:

a driving axle shaft defining an axis of rotation;

a wheel hub driven about said axis of said driving axle shaft;

an electric motor for driving said driving axle shaft;

a first suspension beam extending transversely to said axis of said driving axle shaft and adjacent to said wheel hub, said first suspension beam extending underneath said electric motor for providing support for said electric motor; and a movable connection located underneath said electric motor for interconnecting said electric motor and said suspension beam for allowing rotational movement between said electric motor and said suspension beam.

2. An assembly as set forth in claim 1 wherein an axis of rotation of said electric motor is transverse to said axis of rotation of said driving axle shaft.

3. An assembly as set forth in claim 2 including a gear box interconnecting said electric motor and said driving axle shaft.

4. An assembly as set forth in claim 3 including a flexible coupling interconnecting said electric motor and said gear box for allowing said axis of said electric motor to pivot relative to said gear box.

5. An assembly as set forth in claim 4, wherein said flexible coupling includes a universal joint.

6. An assembly as set forth in claim 4, wherein said flexible coupling includes a tubular connection between a driveshaft from said motor and an input shaft for driving said gear box.

7. An assembly as set forth in claim 2 wherein said connection interconnecting said electric motor and said suspension beam includes a pivot pin for allowing said axis of said electric motor to pivot relative to said suspension beam.

8. An assembly as set forth in claim 1 including a second suspension beam extending in the opposite direction from said first suspension beam and a counter weight disposed on said second suspension beam.

9. An assembly as set forth in claim 1 including a second suspension drive unit assembly mounted at a laterally opposed location from said first suspension drive with a support beam interconnecting said assemblies.

10. An automotive vehicle suspension drive unit assembly comprising:

a driving axle shaft defining an axis of rotation;

a wheel hub driven about said axis of said driving axle shaft;

an electric motor for driving said driving axle shaft;

a first suspension beam extending transversely to said axis of said driving axle shaft and adjacent to said wheel hub, said first suspension beam extending underneath said electric motor for providing support for said electric motor; and a flexible coupling interconnecting said electric motor and said gear box for allowing movement between said electric motor and said gear box wherein said flexible coupling includes inner and outer housing members, with one of said inner and outer housing members being associated with said electric motor and the other of said inner and outer housing members being associated with said gear box, said inner housing member having a first curved surface and said outer housing member having a second curved surface for rotatably engaging said first curved surface.

11. An assembly as set forth in claim 9 wherein said first curved surface is a convex surface having a first edge and said second curved surface is a concave surface having a second edge, said convex and concave surfaces being discontinuous around 360 degrees such that at least one of said convex or concave surfaces have spaces at said first or second edges.

12. An automotive vehicle suspension drive unit assembly comprising:

a driving axle shaft defining an axis of rotation;

a wheel hub driven about said axis of said driving axle shaft; and a first suspension beam extending transversely to said axis of said driving axle shaft and adjacent to said wheel hub;

an electric motor supported on said suspension beam for driving said driving axle shaft, said electric motor having a motor axis of rotation that is transverse to said axis of rotation of said driving axle;

a gear box interconnecting said electric motor and said driving axle shaft; and a flexible coupling interconnecting said electric motor and said gear box for allowing said motor axis of rotation to pivot relative to said gear box, said flexible coupling including inner and outer housing members, with one of said inner and outer housing members being associated with said electric motor and the other of said inner and outer housing members being associated with said gear box, said inner housing member having a first curved surface and a first edge and said outer housing member having a second curved surface and a second edge, wherein said first curved surface is a convex surface and said second curved surface is a concave surface, said convex and concave surfaces being discontinuous around 360 degrees such that at least one of said concave or convex surfaces have spaces at said first or second edge.

13. A vehicle suspension drive unit suspension comprising:

a pair of laterally spaced wheels, each of said wheels being associated with a wheel hub and a driving axle shaft, said driving axle shafts being co-axial and defining an axis of rotation about which said wheel hubs rotate;

gear boxes connected to each of said driving axle shafts;

suspension beams extending transversely to said axis of said driving axle shaft adjacent to each of said wheels and having a first end and a second end;

electric motors mounted on top of each of said suspension beams at said first end and being operatively connected to drive said wheel hubs, there being a flexible connection between said electric motors and said wheel hubs for allowing an axis of each of said electric motors to move relative to said respective gear box; and a counterweight formed on each of said suspension beams at said second ends for countering the additional weight added to said first ends by said electric motors.

14. An assembly as recited in claim 13 including a movable connection underneath each of said electric motors for providing pivotal support between said electric motors and said suspension beams wherein said movable connection includes a pivot point.

15. An assembly as recited in claim 13 wherein said flexible connection includes inner and outer housing members, with one of said inner and outer housing members being associated with said electric motor and the other of said inner and outer housing members being associated with said gear box, said inner housing member having a first curved surface and said outer housing member having a second curved surface for rotatably engaging said first curved surface.

16. An assembly as recited in claim 13, wherein said flexible connection includes a universal joint coupling.

17. An assembly as recited in claim 13, wherein said flexible connection includes a tubular flexible connection.

18. An assembly as set forth in claim 13 wherein said counterweight is integrally formed on said suspension beam.

19. A vehicle suspension drive unit suspension comprising:

a pair of laterally spaced wheels, each of said wheels being associated with a wheel hub and a driving axle shaft, said driving axle shafts being co-axial and defining an axis of rotation about which said wheel hubs rotate;

gear boxes connected to each of said driving axle shafts;

suspension beams extending transversely to said axis of said driving axle shaft adjacent to each of said wheels;

electric motors mounted on each of said suspension beams and associated with each of said first and second wheels, said electric motors being operatively connected to drive said wheel hubs, said electric motors being connected to said suspension beam through a movable connection such that said electric motor may move relative to said suspension beams; and a flexible connection between said electric motors and said wheel hubs for allowing an axis of rotation for said electric motor to move relative to said respective gear box, said flexible coupling connection including inner and outer housing members, with one of said inner and outer housing members being associated with said electric motor and the other of said inner and outer housing members being associated with said gear box, said inner housing member having a first curved surface and a first edge and said outer housing member having a second curved surface and a second edge wherein said first curved surface is a convex surface and said second curved surface is a concave surface, said convex and concave surfaces being discontinuous around 360 degrees such that at least one of said concave or convex surfaces have spaces at said first or second edge.

20. A method of assembling a drive transmission including the steps of:

(1) providing a motor having a first housing portion, providing a gear box having a second housing portion, one of said first and second housing portions being mounted within the other, said first and second housing portions including an inner housing portion and an outer housing portion with said inner housing portion having a curved surface and said outer housing portion having a mating curved surface, at least one of said first and second housing members having said respective surface being discontinuous around 360 degrees such that there are spaces at edges of said surfaces;

(2) aligning said inner housing member and said outer housing member with said curved surfaces aligned with said spaces rather than said curved surfaces; and (3) then turning one of said housings relative to the other such that said curved surfaces move out of such spaces and into mating contact with said curved surfaces of the other of said housing members.

* * * * *